(12) United States Patent
Kokot, Jr. et al.

(10) Patent No.: US 11,767,837 B2
(45) Date of Patent: Sep. 26, 2023

(54) COMPRESSOR CONTROL SYSTEMS AND AIR COMPRESSOR SYSTEMS AND VEHICLES EQUIPPED THEREWITH

(71) Applicant: Vanair Manufacturing Inc., Michigan City, IN (US)

(72) Inventors: Ralph Kokot, Jr., Crown Point, IN (US); Mark Alan Firnhaber, LaPorte, IN (US)

(73) Assignee: Vanair Manufacturing, Inc., Michigan City, IN (US)

( * ) Notice: Subject to any disclaimer, the term of this patent is extended or adjusted under 35 U.S.C. 154(b) by 386 days.

(21) Appl. No.: 17/097,874

(22) Filed: Nov. 13, 2020

(65) Prior Publication Data

US 2021/0148351 A1 May 20, 2021

Related U.S. Application Data

(60) Provisional application No. 62/935,461, filed on Nov. 14, 2019.

(51) Int. Cl.
*F04B 35/06* (2006.01)
*F04B 41/02* (2006.01)
*F04B 39/12* (2006.01)

(52) U.S. Cl.
CPC ............ *F04B 35/06* (2013.01); *F04B 39/123* (2013.01); *F04B 41/02* (2013.01)

(58) Field of Classification Search
CPC ........ F04B 35/06; F04B 41/02; F04B 39/123; F04B 2201/08; B60K 25/06; B60K 2025/005; F04C 2210/1005; G01L 15/00
See application file for complete search history.

(56) References Cited

U.S. PATENT DOCUMENTS

| | | | | |
|---|---|---|---|---|
| 6,491,500 B1 * | 12/2002 | Sun | ......................... | F04C 28/28 417/18 |
| 7,243,541 B1 * | 7/2007 | Bey | ........................ | G01D 21/02 73/431 |
| 7,290,989 B2 * | 11/2007 | Jayanth | .................... | H02H 7/08 417/63 |
| 7,497,124 B2 * | 3/2009 | Kuznia | ................. | G01L 19/141 73/714 |
| 8,770,034 B2 * | 7/2014 | Bentley | ................. | G01L 9/0054 73/715 |

(Continued)

FOREIGN PATENT DOCUMENTS

KR 20160139794 A * 12/2016

*Primary Examiner* — Nathan C Zollinger
(74) *Attorney, Agent, or Firm* — Hartman Global IP Law; Gary M. Hartman; Domenica N.S. Hartman

(57) ABSTRACT

Compressor control systems capable of increasing the reliability and uptime of air compressor systems that operate in harsh corrosive outdoor environments by redundantly sensing one or more operating parameters of the air compressor systems. Such a compressor control system includes a controller adapted to monitor at least a first operating parameter of a component of the air compressor system, at least first and second sensors that are physically separate and spaced apart from each other and that redundantly sense the first operating parameter of a component of the air compressor system, and separate and independent wiring harnesses electrically connecting the first and second sensors to the controller.

18 Claims, 2 Drawing Sheets

(56) References Cited

U.S. PATENT DOCUMENTS

| | | | |
|---|---|---|---|
| 8,840,709 B2* | 9/2014 | Pendzich | B01D 53/002 95/17 |
| 9,480,177 B2* | 10/2016 | Trudeau, Jr. | H02K 5/225 |
| 11,359,630 B2* | 6/2022 | Hebrard | F04C 29/028 |
| 2015/0064040 A1* | 3/2015 | Brostrom | G01F 23/248 418/84 |
| 2019/0249665 A1* | 8/2019 | Kovacsik | F04C 29/02 |
| 2021/0116272 A1* | 4/2021 | Carpenter | G01L 19/0007 |

* cited by examiner

COMPRESSOR CONTROL SYSTEMS AND AIR COMPRESSOR SYSTEMS AND VEHICLES EQUIPPED THEREWITH

CROSS-REFERENCE TO RELATED APPLICATIONS

This application claims the benefit of U.S. Provisional Application No. 62/935,461 filed Nov. 14, 2019, the contents of which are incorporated herein by reference.

BACKGROUND OF THE INVENTION

The present invention generally relates to air compressors that operate in harsh environments. The invention particularly relates to increasing the reliability and uptime for control systems that sense operating parameters of such compressors.

Air compressors that operate in outdoor environments include, but are not limited to, what will be referred to herein as portable compressors and vehicle-mounted compressors. Portable compressors are compressors that may be transported on a trailer and include, as nonlimiting examples, compressors that are directly or indirectly driven by the engine of the vehicle towing the trailer or by an auxiliary engine. Vehicle-mounted compressors are directly mounted on a vehicle (often a truck) and include, as nonlimiting examples, compressors that are directly driven by the engine, transmission, driveline gearbox, or PTO (power takeoff) of the vehicle or an auxiliary engine mounted on the vehicle, or indirectly driven by the vehicle engine or an auxiliary engine through an auxiliary belt drive or hydraulic power system. Portable compressors and vehicle-mounted compressors are widely used by utility companies, maintenance companies, construction and repair companies, pipeline companies, the military, etc., to maintain and repair infrastructure including roads, highways, electric, gas, oil, sewer, railroads, and various other equipment that maintain utilities and other infrastructures. These compressors are typically electronically controlled to enable interfacing with the control of the system (e.g., engine, transmission, PTO, or hydraulic power system) that drives the compressor. Engine, transmission, PTO, and hydraulic power system controls have all moved to electronic sensors and controls, and compressor controls have followed suit.

Electronic compressor control systems typically comprise pressure transducers (sensors), temperature sensors (e.g., thermistors or RTD sensors), electronic controllers (e.g., a programmable logic controller (PLC)), and wiring harnesses that interconnect these components. In existing air compressors currently in use, the pressure and temperature sensors monitor the operating temperature and pressure of the compressor through direct electrical connections with the electronic controller. These sensors are critical to the operation of air compressors by detecting overheating conditions and high and low pressure conditions. In addition to promoting safe operation, the sensors also work with the controller to control compressor operation by adjusting engine speed based on compressed air usage, and turning cooling fans on and off based on operating temperatures. Because of this critical function, if there is a failure of a sensor, electronic compressor controllers are typically programmed to shut off an air compressor and not allow it to restart until the failure condition has been corrected.

Temperature and pressure sensors are typically in locations that can be detrimental to the longevity and reliable operation of the sensors, for example, the compressor air end and air/oil receiver tank (in the case of oil flooded rotary screw compressors). For vehicle-mounted compressors, the compressor air end and air/oil receiver tank are most often mounted under the deck of the vehicle, in and around the chassis of the vehicle. This area of a vehicle is commonly exposed to road salt, dirt, debris and water, in addition to heat from the engine and exhaust system of the vehicle. Portable compressors operate in similar environments if towed behind a vehicle Prolonged exposures to such harsh and corrosive outdoor environments cause corrosion and heat stress to occur in the components of compressor control systems, and in particular the sensors and the electrical connectors that connect the sensors to their wiring harnesses. The use of sealed "weatherproof" plugs helps but does not eliminate the degradation of the sensors and electrical connections due to corrosive environments. As a result, compressor operation can be unreliable due to failure of any of its sensors or connectors. Compressor downtime can be a major expense due to loss of uptime and the inability of work crews to complete their scheduled jobs.

BRIEF SUMMARY OF THE INVENTION

The present invention provides compressor control systems capable of increasing the reliability and uptime of air compressor systems by sensing one or more operating parameters of the air compressor systems, and particularly portable and vehicle-mounted air compressor systems that operate in harsh corrosive outdoor environments.

According to one aspect of the invention, a compressor control system includes a controller adapted to monitor at least a first operating parameter of a component of the air compressor system, at least first and second sensors that are physically separate and spaced apart from each other and that redundantly sense the first operating parameter of a component of the air compressor system, and separate and independent wiring harnesses electrically connecting the first and second sensors to the controller.

According to certain nonlimiting aspects, the first and second sensors may each be mounted at separate locations on THE component of the air compressor system.

According to certain other nonlimiting aspects, the first and second sensors are enclosed in a weather-resistant enclosure located remotely from the component of the air compressor system.

According to still other nonlimiting aspects, the first and second sensors are fluidically connected to the component by a single conduit, and the first operating parameter is transmitted by a fluid flowing through the first conduit to the first and second sensors.

According to yet other nonlimiting aspects, a third sensor is fluidically connected to the component by a second conduit, and a fluid flowing through the second conduit transmits a second operating parameter to the third sensor.

Other aspects of the invention include air compressor systems and vehicles equipped with the compressor control system.

Aspects and advantages of this invention will be appreciated from the following detailed description.

DETAILED DESCRIPTION OF THE INVENTION

Figure 1:
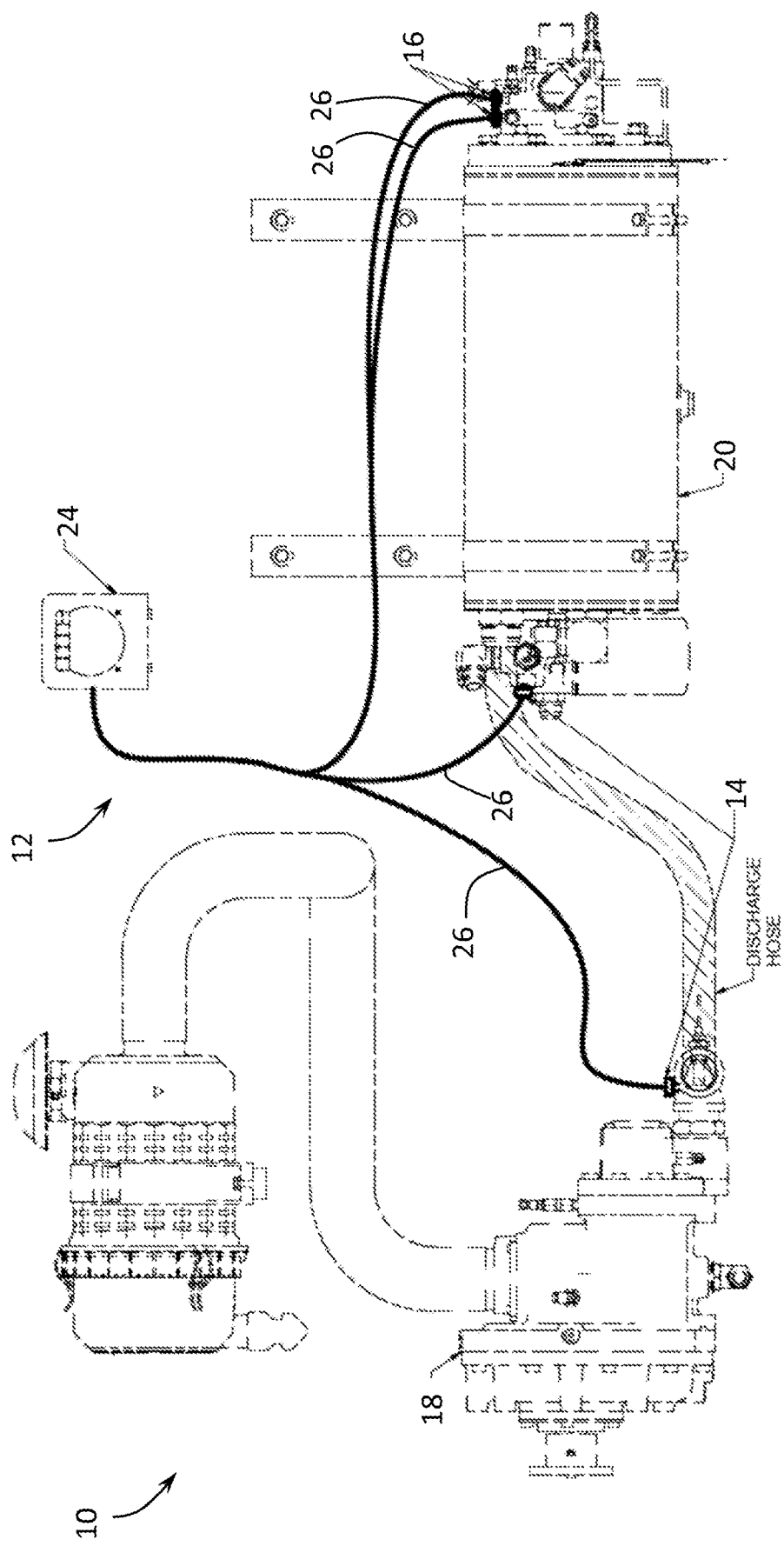
FIG. 1 schematically represents an air compressor system equipped with a compressor control system in accordance with a first nonlimiting embodiment of this invention.
Figure 2:
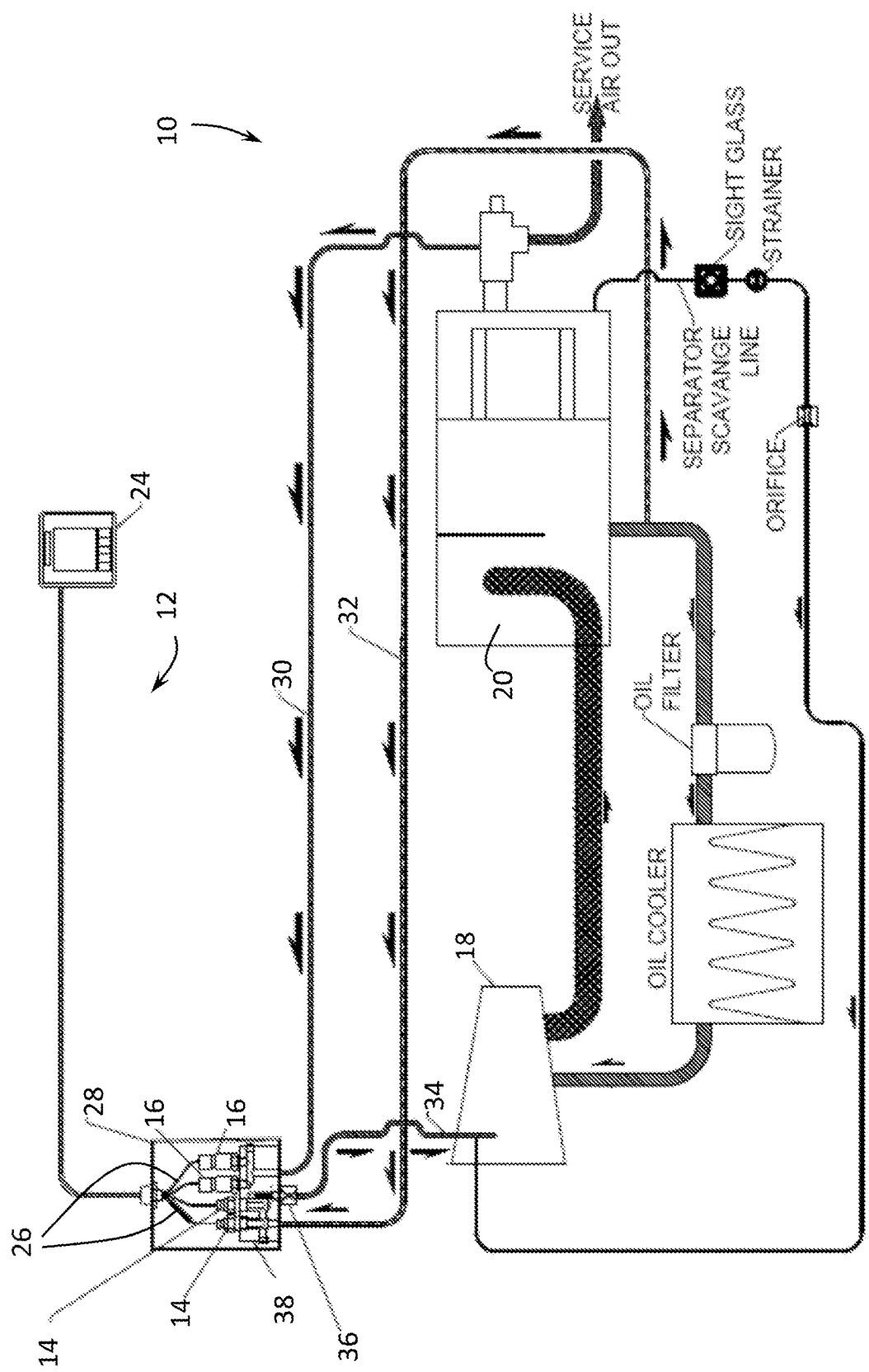
FIG. 2 is a diagram of an air compressor system equipped with a compressor control system in accordance with a second nonlimiting embodiment of this invention.

FIGS. 1 and 2 represent air compressor systems equipped with different compressor control systems that are capable of increasing the reliability and uptime of the air compressor systems by increasing the reliability of sensors that sense operating parameters of the air compressor systems, particularly but not limited to portable compressors and vehicle-mounted compressors operated in harsh corrosive outdoor environments. Notable vehicle applications include utility vehicles, maintenance vehicles, construction vehicles, repair vehicles, pipeline vehicles, and military vehicles. Such air compressor systems comprise an air compressor that may be directly driven by an engine, a transmission, a driveline gearbox, or a power takeoff of a vehicle, or directly driven by an auxiliary engine or an electric motor, or indirectly driven by a vehicle engine, an auxiliary engine, or electric motor through an auxiliary belt drive or hydraulic power system.

For convenience, consistent reference numbers are used throughout the drawings to identify the same or functionally related/equivalent elements.

FIG. 1 schematically represents a first embodiment of a control system 12 installed on an air compressor system 10 that comprises an air compressor 18 and an air/oil separator tank 20. The control system 12 is shown with redundant sensors, represented but not limited to temperature sensors (senders) 14 and pressure sensors 16 (transducers) 16 in FIG. 1. Whereas conventional air compressor control systems typically use a single sensor of each type, the system of FIG. 1 uses two or more sensors for sensing each operating parameter of interest (e.g., pressure or temperature), resulting in a redundancy for the sensing of a given operating parameter of the air compressor 18.

The control system 12 of FIG. 1 includes a controller 24 that is programmed to receive and process the outputs of all four sensors 14 and 16. If there is a failure in any individual sensor 14 or 16, the controller 24 provides a warning message, for example, on a display of the controller 24, that a sensor failure has occurred and service will be required soon. The controller 24 allows the compressor 18 to function normally until the faulty sensor 14 or 16 is replaced, for example, during off hours or during planned maintenance time so as not to cause a work crew using the compressor 18 to lose time on the job. If the operator chooses to ignore the warning, the compressor 18 will continue to operate unless the second/redundant sensor 14 or 16 of the same type fails as well. This arrangement greatly increases the uptime of the compressor 18 when combined with maintenance as indicated by the controller 24.

Redundant sensors exist that are configured as single devices with dual sensing elements within the same housing. However, depending on the type of failure, dual sensing elements may be only marginally better than single element sensors. If a redundant sensor is vulnerable to ingress by corrosive contamination, the internal connections or electronics inside the device can fail, causing both sensing elements to fail. In addition, redundant sensors with dual sensing elements have a single connection plug that creates another shared failure point. If corrosion inside the connection plug is the cause of an electrical failure, the system sees both sensing elements as having failed and, as a result, will indicate an overall system failure. In contrast, the embodiment of FIG. 1 utilizes redundant sensors 14 and 16 that are entirely separate from each other, with their individual sensing elements (which may be a single sensing element in an individual sensor 14 or 16 or dual (multiple) sensing elements in an individual sensor 14 or 16) located within different sensor housings. Furthermore, as represented in FIG. 1, the individual sensors 14 and 16 each have a separate wiring harness (connector) 26 that electrically connects the sensor 14 or 16 to the controller 24. As such, none of the sensors 14 and 16 shares a connector or harnesses that electrically connects the sensor 14 and 16 to the controller 24, so as to further increase redundancy by enabling the sensors 14 and 16 to operate entirely independently of each other. The use of independent redundant sensors 14 and 16 in this manner avoids system failures attributable to internal corrosion of sensor electronics and plug corrosion failures resulting from operation of the compressor 18 and its control system 12 in hostile outdoor environments. As also shown in FIG. 1, the temperature sensors 14 are located at different locations in the air compressor system 10 (at the compressor 18 and at the tank 20), and the pressure sensors 16 are also located at different locations in the air compressor system 10 (both at the tank 20). As such, the environmental hazards to which the sensors 14 and 16 may be exposed may differ from each other.

FIG. 2 schematically represents a second embodiment of a control system 12 with redundant sensors 14 and 16, represented but not limited to a pair of temperature sensors (senders) 14 and a pair of pressure sensors 16 (transducers) 16 in FIG. 2, that are each have separate and independent wiring harnesses 26 that electrically connect the sensors 14 and 16 to the controller 24. In contrast to the embodiment of FIG. 1, the compressor control system 12 of FIG. 2 remotely locates the sensors 14 and 16 in a sealed and weather-resistant enclosure (junction box) 28. In the case of a vehicle-mounted compressor, the enclosure 28 can be mounted in a location that is directly exposed to the harsh outdoor environment in which the vehicle is operating, or located in a relatively protected area of the vehicle such as in a compartment or in the service body of a truck. Though redundant temperature and pressure sensors 14 and 16 are shown (e.g., two temperature sensors 14 and two pressure sensors 16), it is foreseeable that a similar configuration could use a single sensor of one or both types and/or multiple sensors of one or both types.

When mounted in the weather-resistant enclosure 28, the sensors 14 and 16 are isolated from moisture and corrosion, which are typically the primary cause of failure in harsh outdoor environments. The sensors 14 and 16 are shown as mounted to a manifold 38 located within the enclosure 28 and to which conduits 30, 32, and 34 are connected. As evident from FIG. 2, the manifold 38 provides oil from the same single location and source to both of temperature sensors 14, and supplies oil from the same single location and source to both of the pressure sensors 16, so that the temperature sensors 14 are redundant to each other and the pressure sensors 16 are redundant to each other.

For pressure sensing a suitable compressor operating pressure, the pressure sensors 16 are represented as connected with the conduit 30 to the separator tank 20 of the compressor system 10 as shown, so that oil within the conduit 30 equally transmits pressure to each of the pressure sensors 16. Though flowing oil is unnecessary for the pressure sensors 16, it is within the scope of the invention for oil to flow through the conduit 30 to the sensors 16. Porting within the manifold 38 is arranged so that the oil contacts the sensing elements of the pressure sensors 16 within the manifold 38.

As a result of the temperature sensors 14 being remote from the components of the air compressor system 10 and enclosed within the enclosure 28, accurate temperature sensing of the air compressor 18 requires that the temperature sensors 14 are subjected to flowing oil so that the sensors 14 are able to sense the true operating temperature of the compressor 18. For this reason, accurate temperature sensing is shown in FIG. 2 as being accomplished by routing flowing oil through the conduit 32 (preferably insulated) from a hot oil connection of the tank 20, so that oil flowing within the conduit 32 equally transmits temperature to each of the temperature sensors 14. The oil flows and contacts the sensing elements of the temperature sensors 16 within the manifold 38 before exiting the manifold 38 and being returned by the conduit 34 to the low pressure side of the compressor 18, for example, in the same location that the separator scavenge oil is returned. The conduit 34 can be equipped with an orifice 36 to regulate the oil flow to prevent excessive hot oil from being returned to the compressor 18. The orifice 36 may be equipped with a filter to ensure that contaminants are not entrained in the oil being returned to the compressor 18.

In view of the above, the nonlimiting embodiment of FIG. 2 represents oil from the same location within the air compressor system 10 being supplied to both of the temperature sensors 14 through a single insulated conduit 32, and oil from the same location within the air compressor system 10 being suppled to both of the pressure sensors 16 through a single insulated conduit 30. It is foreseeable that the oil for the sensors 14 and 16 could be drawn from other locations in the oil system of the air compressor system 10.

In view of the above, the embodiment of FIG. 2 combines redundant sensing with physically locating the sensors 14 and 16 in one location that is protected and remote from the harsh corrosive environment where the compressor 18 and its air/oil receiver tank 20 are typically mounted.

Though described and shown as utilizing two temperature sensors 14 and two pressure sensors 16, other embodiments of the invention may utilize only one or more temperature sensors 14, and/or one or more pressure sensors 16, and/or one or more sensors adapted to sense an operating parameter other than temperature or pressure. As a nonlimiting example, the control system 12 could make use of only two sensors 14 and/or 16, including one of each type of sensor 14 or 16, mounted to the manifold 38 within the enclosure 28. Furthermore, though described and shown in reference to portable compressors 18 and vehicle-mounted compressors 18, the redundant and remote-mounted sensor arrangements represented in FIGS. 1 and 2 may be useful in other types of compressor systems, such as electric-driven industrial duty-type compressors, where sensor failures can also occur and reductions in downtime achievable with the control systems 12 described above would be desirable.

In view of the above, while the invention has been described in terms of particular embodiments, it should be apparent that alternatives could be adopted by one skilled in the art. Additionally, the air compressor systems 10, the control systems 12, and their components could differ in appearance and construction from the embodiments described herein and shown in the drawings, functions of certain components of the systems 10 and 12 could be performed by components of different construction but capable of a similar (though not necessarily equivalent) function, and various materials could be used in the fabrication of the systems 10 and 12 and/or their components. As such, it should be understood that the above detailed description is intended to describe the particular embodiments represented in the drawings and certain but not necessarily all features and aspects thereof, and to identify certain but not necessarily all alternatives to the represented embodiments and described features and aspects. As a nonlimiting example, the invention encompasses additional or alternative embodiments in which one or more features or aspects of a particular embodiment could be eliminated or two or more features or aspects of different embodiments could be combined. Accordingly, it should be understood that the invention is not necessarily limited to any embodiment described herein or illustrated in the drawings. It should also be understood that the purpose of the above detailed description and the phraseology and terminology employed therein is to describe the illustrated embodiments, and not necessarily to serve as limitations to the scope of the invention. Therefore, the scope of the invention is to be limited only by the following claims.

The invention claimed is:

1. A compressor control system of an air compressor system, the compressor control system comprising:
    a controller adapted to monitor at least a first operating parameter of a component of the air compressor system, the component comprising an air/oil separator tank of the air compressor system;
    at least first and second sensors that are physically separate and spaced apart from each other and redundantly sense the first operating parameter of the component the first and second sensors being both fluidically connected to the component by a first conduit, the first operating parameter being transmitted with a fluid flowing through the first conduit from the component to each of first and second sensors;
    at least a third sensor fluidically connected to the component by a second conduit that is separate from the first conduit;
    a manifold within an enclosure that is located remotely from the component, the first, second, and third sensors being mounted to the manifold, the first and second conduits fluidically connecting the manifold to the component;
    a third conduit through which the fluid flows from the manifold back to an air compressor of the air compressor system; and
    separate and independent wiring harnesses electrically connecting the first and second sensors to the controller.

2. The compressor control system of claim 1, wherein the enclosure is a weather-resistant enclosure that isolates the first and second sensors from moisture.

3. The compressor control system of claim 1, wherein the first conduit draws the fluid from a single location of the component.

4. The compressor control system of claim 1, wherein the fluid flows from the component through the first conduit and then through the manifold to each of the first and second sensors.

5. The compressor control system of claim 3, wherein the first operating parameter is temperature or pressure of the fluid.

6. The compressor control system of claim 1, wherein the fluid flows to the third sensor from a location of the component that is different from a location from which the fluid is drawn to the first and second sensors, and the third sensor is adapted to monitor a second operating parameter of the component that is transmitted with the fluid flowing through the second conduit from the component to the third sensor.

7. The compressor control system of 6, wherein the fluid transmits the first and second operating parameters from the component through the first and second conduits and then through the manifold to each of first, second, and third sensors.

8. The compressor control system of claim 6, wherein the first and second sensors are temperature sensors and the first operating parameter is oil temperature of the component.

9. The compressor control system of claim 8, wherein the third sensor is a pressure sensor and the second operating parameter is oil pressure of the component.

10. The compressor control system of claim 6, wherein the first and second sensors are pressure sensors and the first operating parameter is oil pressure of the component.

11. The compressor control system of claim 10, wherein the third sensor is a temperature sensor and the second operating parameter is oil temperature of the component.

12. The compressor control system of claim 1, wherein the air compressor system is a portable air compressor system.

13. The compressor control system of claim 1, wherein the air compressor system is a vehicle-mounted air compressor system.

14. A vehicle on which the compressor control system and the vehicle-mounted air compressor system of claim 13 are mounted.

15. The vehicle of claim 14, wherein the vehicle is a utility vehicle, a maintenance vehicle, a construction vehicle, a repair vehicle, a pipeline vehicle, or a military vehicle.

16. The compressor control system of claim 1, wherein the air compressor is directly driven by an engine, a transmission, a driveline gearbox, or a power takeoff of a vehicle or an auxiliary engine, or indirectly driven by a vehicle engine or an auxiliary engine through an auxiliary belt drive or hydraulic power system.

17. The compressor control system of claim 1, wherein the air compressor system is driven by an electric motor used in an industrial or commercial application.

18. The air compressor system comprising the compressor control system of claim 1.

* * * * *